US008410400B2

(12) United States Patent
Fondriest

(10) Patent No.: US 8,410,400 B2
(45) Date of Patent: Apr. 2, 2013

(54) WELDED METAL LAMINATE STRUCTURE AND METHOD FOR WELDING A METAL LAMINATE STRUCTURE

(75) Inventor: Daniel Fondriest, Canton, MI (US)

(73) Assignee: Material Sciences Corporation, Elk Grove, IL (US)

( * ) Notice: Subject to any disclaimer, the term of this patent is extended or adjusted under 35 U.S.C. 154(b) by 1145 days.

(21) Appl. No.: 12/333,578

(22) Filed: Dec. 12, 2008

(65) Prior Publication Data

US 2010/0147818 A1 Jun. 17, 2010

(51) Int. Cl.
*B23K 9/00* (2006.01)
(52) U.S. Cl. .............................. 219/137 WM; 219/137 R
(58) Field of Classification Search .............. 219/137 R, 219/137 WM, 137.2, 137.7, 121.11, 74, 124.5; 156/60, 299
See application file for complete search history.

(56) References Cited

U.S. PATENT DOCUMENTS

| 5,510,597 | A * | 4/1996 | Kampmann et al. ...... 219/137 R |
| 5,609,782 | A * | 3/1997 | Kim .............................. 219/132 |
| 7,176,410 | B2 * | 2/2007 | Fortain et al. ........... 219/137 PS |
| 2003/0010764 | A1 * | 1/2003 | Handa et al. ............. 219/137 R |
| 2003/0136774 | A1 * | 7/2003 | Nikodym et al. ..... 219/137 MW |
| 2004/0026396 | A1 * | 2/2004 | Nikodym ............. 219/137 MW |
| 2004/0035504 | A1 * | 2/2004 | Ananthanarayanan et al. ............................ 148/519 |
| 2005/0006363 | A1 * | 1/2005 | Hsu et al. ................. 219/130.01 |
| 2008/0314876 | A1 * | 12/2008 | Pinsonneault et al. .......... 219/74 |

FOREIGN PATENT DOCUMENTS

| JP | 59193788 | A | | 11/1964 |
| JP | 53102850 | A | * | 9/1978 |
| JP | 62212068 | A | | 9/1987 |
| JP | 05042370 | A | | 2/1993 |
| JP | 94036990 | B2 | * | 5/1994 |
| JP | 08267248 | A | | 10/1996 |
| JP | 2001138055 | A | | 5/2001 |

* cited by examiner

*Primary Examiner* — Henry Yuen
*Assistant Examiner* — Jianying Atkisson
(74) *Attorney, Agent, or Firm* — Quinn Law Group PLLC

(57) ABSTRACT

An improved method for welding a laminated metal structure is presented herein. In one embodiment, the method includes: placing the laminated structure against a second work piece, feeding a consumable metal cored wire electrode to the weld zone, feeding a stream of shielding gas to the weld zone, and melting the consumable metal cored wire electrode. If the weld joint is a plug weld, the method also includes forming a plug hole in one of the work pieces, melting the consumable metal cored wire electrode along the circumference of the plug hole, and thereafter progressively spiraling the welding gun inwards towards the center of the plug hole to fill it with the melted electrode. The method may also include determining if melting the electrode is causing sputtering, and delaying spiraling the welding gun inwards until the sputtering subsides. A welded laminate metal structure is also provided herein.

9 Claims, 2 Drawing Sheets

WELDED METAL LAMINATE STRUCTURE AND METHOD FOR WELDING A METAL LAMINATE STRUCTURE

TECHNICAL FIELD

The present invention relates generally to laminated metal structures, and more specifically to welded metal-polymer-metal laminate structures, and methods of welding metal-polymer-metal laminates to other metal or metal laminate structures.

BACKGROUND OF THE INVENTION

In various industries, metal laminate structures comprising a polymeric core sandwiched between two metallic layers are used to manufacture a variety of different products. An example of such metal-polymer-metal laminates includes a constrained layer damper for the prevention and attenuation of vibration. Most constrained layer dampers, or "CLD" for short, include a very thin layer of a vibration-absorbing viscoelastic material that is disposed between and adhered to two metal-panel constraining layers. Constrained layer dampers are used in the automotive industry for vehicle body panels as well as damping inserts for automobile brake systems to diminish the propagation of structure-borne noise and the transmission of airborne noise.

In conventional practice, metal laminate structures are joined to other metal structures by riveting, bolting, or welding the two work pieces together. Welding is a manufacturing process that bonds materials, usually metals or thermoplastics, by causing coalescence—the process by which two separate units grow together, fuse, or merge into a single body. The work pieces are joined by liquefying or plasticizing (softening without liquefying) the areas to be bonded together, generally through the application of heat and/or pressure, and adding a filler material to form a localized pool of molten material (the "weld puddle"). Promoting coalescence of the liquefied or plasticized materials, and subsequently allowing the coalesced materials to cool will solidify the bond. Welding can be used, for example, to join two or more work pieces, or for operating on a single work piece (e.g., to repair a crack or join two ends together).

The quality of a weld is predominantly gauged by its strength and the strength of the material around it. Weld quality is influenced by various factors, the most influential factor being the method of welding. One such method is gas metal arc welding (GMAW), sometimes referred to by its subtypes metal inert gas (MIG) welding or metal active gas (MAG) welding. In GMAW, a continuous and consumable wire electrode and a shielding gas, typically inert, are fed through a welding gun. An electrical arc is struck between this electrode and the work piece(s) to be welded. The filler metal wire supplies the electric current to maintain the arc, which is shielded from the access of air by the shielding gas. The feed wire electrode is continuously fed towards the work piece(s), and consumed by melting under the intense heat of the arc. The metal of this electrode deposits on the base material thus forming the weld.

Gas metal arc welding has been utilized as a welding process for welding metal laminates with arguably mixed results. Laminated metal structures have heretofore been welded with GMAW using solid wire filler metal. The solid wire filler requires increased welding parameters, such as increased welding voltage and welding current, to melt the entire cross-section of the wire. The higher weld current results in increased weld porosity and melt through, both of which are undesirable welding defects. Using a solid wire electrode may also cause the arc to have turbulent, violent characteristics, which is known in the art as "sputter".

SUMMARY OF THE INVENTION

According to one embodiment of the present invention, a method is provided for welding a first work piece to a second work piece. One or both of the work pieces is a laminated metal structure. The laminated metal structure is characterized by first and second metallic constraining layers, and a polymeric layer that is disposed between and bonded to the two metallic constraining layers. The method includes: placing the first work piece against the second work piece at a weld zone; feeding a consumable metal cored wire electrode to the weld zone through the welding gun; feeding a stream of shielding gas to the weld zone; and melting the consumable metal cored wire electrode to thereby form a weld joint at the weld zone.

In one aspect of this particular embodiment, a plug weld joint is formed. In this instance, the method also includes creating one or more plug holes in one of the work pieces prior to welding. The metal cored wire electrode is then melted into each plug hole. In order to form the weld joint, the welding gun is first moved in a circular motion around the perimeter of each plug hole, applying the melted metal cored wire electrode to the circumference of each plug hole. Thereafter, the welding gun is progressively spiraled inward towards the center of the plug hole to fill it with the melting electrode. When creating the plug weld joint, the operator should determine if melting the consumable metal cored wire electrode is causing "sputtering". If so, the operator should delay spiraling the welding gun inwards until the sputtering subsides.

According to another facet of this embodiment, a "pre-flow" stream of shielding gas should start 0.5 seconds before melting the metal cored wire electrode, and finish 3 seconds after (i.e., a 3 second "post flow"). Ideally, the stream of shielding gas is approximately 90% argon and 10% carbon dioxide. The stream of shielding gas is preferably fed at a flow rate of approximately 35 cubic feet per hour (CFH).

In accordance with yet another aspect, the consumable metal cored wire electrode includes a metallic tubular body (or "sheath") with a hollow core. The core is at least partially filled with a welding powder, such as a combination iron, manganese, and silicon powder. The metal cored wire electrode is preferably fed at a rate of approximately 135 inches/minute.

According to another embodiment of the present invention, a method of gas metal arc welding (GMAW) is provided for welding a laminated steel structure to a second work piece, which may be, for example, a second end of the same laminated steel structure. The laminated steel structure includes first and second steel-panel constraining layers that are bonded to a viscoelastic core (VEC). The viscoelastic core is disposed between, and spans substantially the entirety of the first and second steel constraining layers.

The method includes: forming at least one plug hole through the laminated steel structure or the second work piece; overlapping the laminated steel structure and the second work piece at a predetermined weld zone; feeding a consumable metal cored wire electrode through a continuous-feeding type welding gun to the weld zone, the metal cored wire electrode including a metallic tubular body with a core that is at least partially filled with a metallic powder; feeding a generally continuous stream of shielding gas to the weld zone generally contemporaneous with the feed of metal cored wire; and melting the consumable metal cored wire electrode into each plug hole by forming an arc between the consumable metal cored wire electrode and the laminated steel structure or the second work piece. The arc is formed, in part, by passing an electrical current through the electrode. The current is of sufficient amperage and voltage to melt the metal cored wire electrode.

As part of another embodiment of the present invention, a welded metal structure is presented. The welded metal structure includes two metal work pieces, at least one of which is a laminated metal structure. In this embodiment, the laminated metal structure includes two metallic constraining layers, and a polymeric layer disposed between and bonded to the metallic constraining layers. The two metal work pieces abut one another, and are joined at a predetermined weld zone by a weld joint that formed from a metal cored welding wire. The weld joint is configured such that substantially all porosity is eliminated therefrom, and substantially all melt through is eliminated from the weld zone. The weld joint may be, for example, a plug weld joint, a butt weld joint, a lap weld joint, a fillet weld joint, or a fillet-bevel weld joint.

In accordance with one facet of this embodiment, one of the work pieces is a steel panel, such as hot dipped galvanized mild steel. Alternatively, both work pieces are laminated metal structures.

According to another aspect, each of the metallic constraining layers is composed, at least partially, of steel. To this regard, both of the metallic constraining layers may include an electro-galvanized coating on both sides thereof.

As part of another aspect of this embodiment, the polymeric layer is composed, at least partially, of a viscoelastic material that spans substantially the entirety of the first and second metallic constraining layers.

The above features and advantages, and other features and advantages of the present invention will be readily apparent from the following detailed description of the preferred embodiments and best modes for carrying out the present invention when taken in connection with the accompanying drawings and appended claims.

DETAILED DESCRIPTION OF THE PREFERRED EMBODIMENT

Figures 1, 1A:
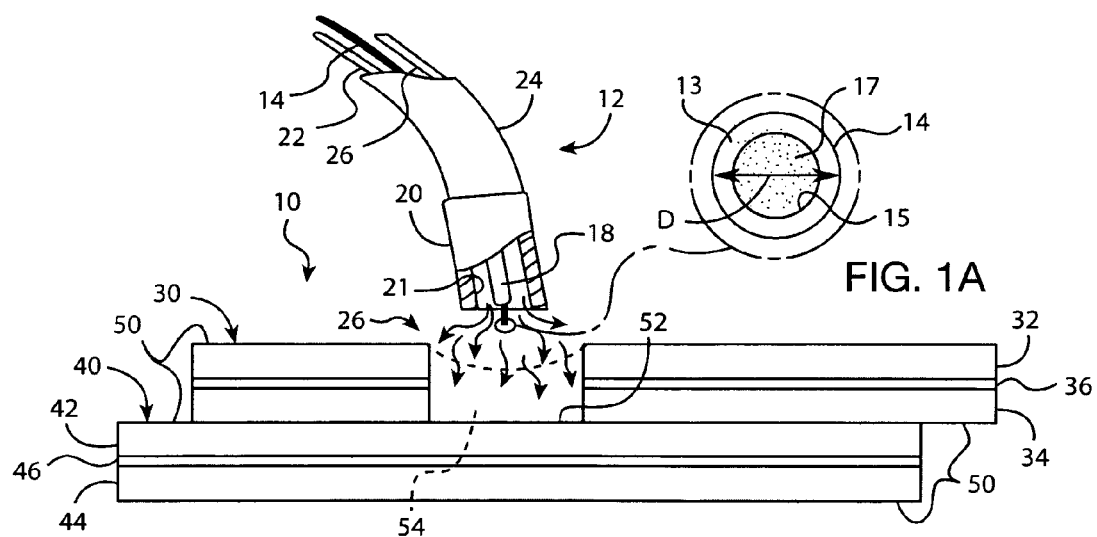
FIG. 1 is a schematic, partial cross-sectional, side-view illustration of an exemplary gas metal arc welding (GMAW) gun and a welded metal structure in accordance with one embodiment of the present invention.
FIG. 1A is a schematic end-view illustration of an exemplary consumable metal cored wire electrode in accordance with the present invention.

Referring to the drawing, wherein like reference numbers refer to like elements throughout the several views, FIG. 1 schematically illustrates a representative welded metal structure, designated generally by reference numeral 10, in accordance with the present invention. The various embodiments of the present invention are described herein with respect to the welded metal structures illustrated throughout the drawings, which are provided purely for explanatory purposes. It should therefore be readily understood that the present invention is by no means limited to the arrangements presented in FIGS. 1-4. In addition, the drawings presented herein are not to scale, and are provided purely for instructional purposes. Thus, the individual and relative dimensions and orientations shown in the drawings are not to be considered limiting.

FIG. 1 schematically illustrates an exemplary welding gun, indicated generally at 12, for practicing the methods and creating the various welded metal structures of the present invention. The welding gun 12 (also known in the art as a "weld torch" or "shielded arc torch") is preferably a continuous feed, consumable wire electrode gas-metal-arc-welding (GMAW) gun. By way of explanation, a consumable metal cored wire electrode 14 (also referred to hereinafter as "electrode" for brevity purposes) extends through the central bore of the welding gun's 12 tubular wire guide and contact tip 18. The electrode 14 is drawn from a feed reel (not shown), and axially fed through the contact tip 18 in a preferably continuous manner by a conventional wire feeder (not explicitly illustrated herein), which is capable of feeding wire at the speeds necessary to achieve the desired deposition rates. The contact tip 18 is fitted within the bore 21 of a gas nozzle (or "torch cup") 20. The tubular contact tip 18 may be adjustable—e.g., movable endwise within the bore 21 of the gas nozzle 20, for adjusting its effective length.

A tubular conduit 22 extends through an electrically insulated and gas impervious feed sleeve 24 to the gas nozzle 20. The tubular conduit 22 delivers a shielding gas, schematically illustrated at 26 in FIG. 1, from a gas source (not shown) through the bore 21 on the inside of the nozzle 20. Gases flow through the conduit 22 into the nozzle 20, and thence axially between the inner surface of the gas nozzle 20 and the outer surface of the wire guide 18. The shielding gas 26 is preferably inert, with a composition of approximately 90% argon and 10% carbon dioxide. Ideally, the torch cup 20 should extend beyond the front end of the contact tip 18, e.g., the contact tip 18 is recessed within the torch cup 20 a distance equal to at least 1/16 inch or 1.59 millimeters (mm). The torch cup 20 size is preferably 5/8 inch or 15.88 mm.

Turning to FIG. 1A, the consumable metal cored wire electrode 14 includes a metallic tubular body (or "sheath") 13 with a hollow core 15. The electrode diameter D is preferably 0.035 inch or 0.89 mm. The core is at least partially filled with a welding powder 17. In a preferred embodiment, the metal cored wire electrode 14 is an AWS A5.18 E-70C 6M H4 wire or equivalent, which has a filler composition of 2-3% manganese, 0.5-2% silicon, less than 0.2% each of carbon, titanium, zirconium, aluminum oxide, iron oxide, potassium oxide, silicon dioxide, and sodium oxide, and the balance iron. It should be recognized that the composition of the cored wire filler may be modified to meet that particular needs of the intended application without departing from the scope and spirit of the present invention.

A pair of work pieces, designated respectively as 30 and 40 in FIG. 1, are superposed, abutted, or overlapped to form a joining or operating region. An electric arc is established between the tip of the consumable electrode 14 and the first work piece 30 by energizing the electrode 14, and feeding the electrode 14 into direct contact with the work piece 30. An electric current is supplied to the consumable electrode 14 by an electric conductor 26. The electrical current passed through the electrode 14 is of sufficient amperage and voltage to melt the metal cored wire electrode 14. By way of example, the power supplied via the conductor 26 is fed at approximately 90 amps and 15 volts. Heat created by the arc causes the tip of the electrode 14 to melt, thereby forming a droplet of molten metal. Due to the combination of electromagnetic and gravitational forces present, the droplet ultimately detaches and transfers along the arc to the work piece 30.

The weld torch 12 may be either manually operated or mechanized. For instance, the supply of electrical current, shielding gas, and electrode wire is controlled, for example, by a trigger or switch (not shown) on the handle of the welding gun. Alternatively, the weld torch 12 may be integrated into a robotic device or other automated apparatus. Since the welding gun, per se, is not the subject of this invention, it has been greatly simplified, it being understood that further information regarding the standard operation of a GMAW gun may be found in the prior art.

In accordance with the present invention, one or both of the metal work pieces 30, 40 is a laminated metal structure (also referred to herein as "laminate structure"). In the embodiment presented in FIG. 1, both work pieces 30 and 40 are laminated steel structures. The first work piece 30 is characterized by a first metallic constraining layer 32 and a second metallic constraining layer 34 with a polymeric layer 36 that is disposed between and bonded to the first and second metallic constraining layers 32, 34. Likewise, the second work piece 40 is characterized by a first metallic constraining layer 42 and a second metallic constraining layer 44 with a polymeric layer 46 that is disposed between and bonded to the first and second metallic constraining layers 32, 34. Each of the metallic constraining layers 32, 34, 42, 44 is composed, at least partially, of steel. The steel-panel constraining layers 32, 34, 42, 44 may include an optional electro-galvanized coating 50 on both sides thereof for corrosion resistance.

The metal work pieces 30, 40 of FIG. 1 may be fabricated as constrained layer dampers. In this instance, the polymeric layers 36, 46 are composed, at least partially, of a viscoelastic material, such as natural rubber or a synthetic polymer. The viscoelastic material spans substantially the entirety of (i.e., is coextensive with) the first and second steel-panel constraining layers, and is bonded, attached or adhered thereto, for example, by a high tack polymer, a cold-forming PSA acrylic adhesive, a dry-bond adhesive, such as polyester urethanes, and the like. Notably, the first and second laminated metal structures 30, 40 may include additional constraining layers, additional polymeric layers, and various other additional layers without departing from the intended scope of the present invention.

The first and second work pieces 30, 40 are joined, as described hereinbelow, to form the welded metal structure 10. A method for welding a first work piece to a second work piece is presented herein. In one preferred embodiment, a method of gas metal arc welding (GMAW) for welding a laminated steel structure is provided. The methods of the present invention are described herein with respect to the structures illustrated in FIGS. 1 through 4. However, it is envisioned that the present invention be applied to other structural arrangements and other types of welding techniques. It should be further noted that the methods described below represent a single weld operation. However, it is contemplated that the method be applied in a systematic manner to produce multiple welds. Furthermore, the methods presented herein can be used in a variety of manufacturing processes, such as for operating on a single work piece, for joining two or more work pieces together, or for joining two ends of a single work piece. Finally, the methods preferably include at least those steps highlighted below. However, it is within the scope and spirit of the present invention to omit steps, include additional steps, and/or modify the order presented.

In the embodiment of FIG. 1, a plug weld joint is created to unite the two work pieces 30, 40. In this instance, one or more plug holes 52 are fashioned through one of the work pieces, namely the first work piece 30, prior to welding. Although the size of the plug hole 52 may be varied to provide particular weld characteristics, in this embodiment the plug hole diameter is approximately 6-8 mm (0.24-0.31 inches). The first work piece 30 is then placed on top of the second work piece 40 (or vice versa) such that the plug hole 52 is positioned at a predetermined weld zone. The metal cored wire electrode 14 is then melted into each plug hole 52.

As explained above, the consumable metal cored wire electrode 14 is delivered to the weld zone through the welding gun 12. The metal cored wire electrode 14 is preferably fed at a rate of approximately 135 inches/minute. Contemporaneous with the feed of metal cored wire 14, a stream of shielding gas 26 is fed to the weld zone via the welding gun 12 so that it forms a shroud for shielding the electric arc from ambient atmosphere. The stream of shielding gas 26 is preferably fed at a flow rate of approximately 35 cubic feet per hour (CFH). In preferred practice, a "pre-flow" stream of shielding gas 26 should start 0.5 seconds before melting the metal cored wire electrode 14, and finish 3 seconds after the plug weld is formed (i.e., a 3 second "post flow")

The welding gun 12 has a travel angle of approximately 90 degrees with respect to the first work piece 30. In order to form the weld joint, shown hidden in FIG. 1 at 54, an electric arc is struck between the electrode 14 and work piece 30. The welding gun 12 is first moved in a circular motion around the perimeter of the plug hole 52. In so doing, the melted metal cored wire electrode is deposited along the circumference of each plug hole 52. After, for example, one or two revolutions, the welding gun 12 is progressively spiraled inward towards the center of the plug hole 52 to fill it with the melting electrode. The weld torch 12 should maintain a contact tip to work piece distance of approximately ⅝ inch (15.88 mm).

When creating the plug weld joint 52, the operator or automated welding apparatus should determine if melting the consumable metal cored wire electrode is causing "sputtering". Sputtering can be characterized as a loud audible noise that is created by the interference of a non-metallic material, in this case the polymeric layer 36, with the electrical arc. If sputtering is detected, the operator should continue to traverse the circumference of the plug hole 52, and delay spiraling the welding gun 12 inwards toward the center of the plug hole 52 until the sputtering subsides. The cessation of weld sputter is an indication that the perimeter of the plug hole 52 has sealed.

The GMAW method described above minimizes or eliminates substantially all melt through from the weld zone, and reduces weld spatter during the welding operation. This is so because the welding parameters, such as current and voltage, are much lower, and the weld arc is more controlled. In addition, the weld joints that are created in accordance with the present invention are formed with significantly less porosity than their conventional counterparts.

Figure 2:
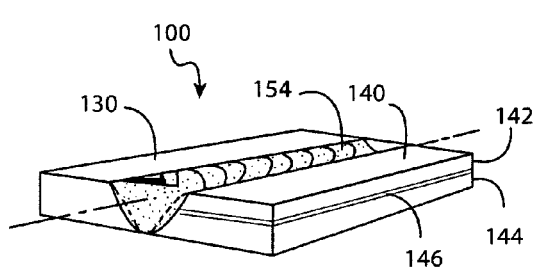
FIG. 2 is a perspective-view illustration of a welded metal structure in accordance with another embodiment of the present invention.
Figure 3:
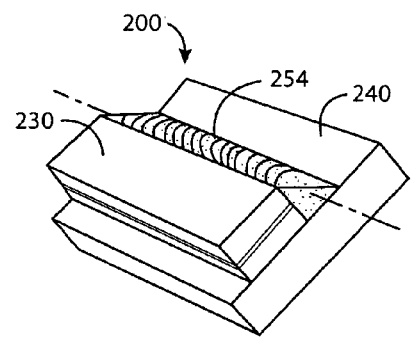
FIG. 3 is a perspective-view illustration of a welded metal structure in accordance with yet another embodiment of the present invention.
Figure 4:
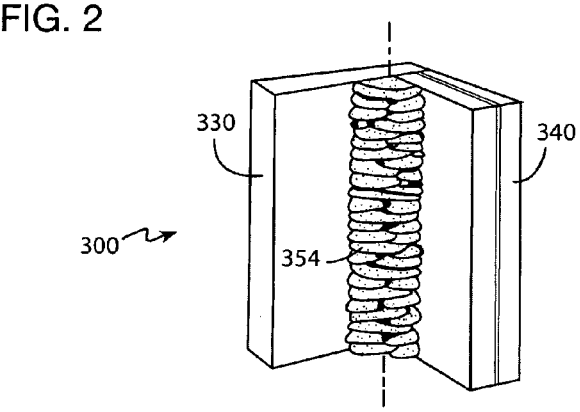
FIG. 4 is a perspective-view illustration of a welded metal structure in accordance with even yet another embodiment of the present invention.

FIGS. 2-4 illustrate various additional welded metal structure configurations and weld joint types in accordance with the present invention. The welded metal structure 100 of FIG. 2 depicts a first metal work piece 130 that is welded to a second metal work piece 140 utilizing a butt weld joint 154, which is formed in accordance with the present invention. In addition, unlike the embodiment presented in FIG. 1, the first work piece 130 is a steel panel, which may be fabricated, for example, from a roll of hot dipped galvanized mild steel. The second work piece 140 is characterized by a first metallic constraining layer 142 and a second metallic constraining layer 144 with a polymeric layer 146 that is disposed between and bonded to the first and second metallic constraining layers 142, 144. The second work piece 140 of FIG. 2 may be similarly configured, and thus functionally equivalent to the first and second work pieces 30, 40 of FIG. 1.

Turning then to FIG. 3, the welded metal structure 200 presented therein comprises a laminated metal structure 230, which may be configured similarly to the first and second work pieces 30, 40 of FIG. 1, that is welded to a second metal work piece 240 utilizing a lap weld joint 154, which is formed in accordance with the present invention. In an alternative embodiment, FIG. 4 illustrates another welded metal structure 300 that is formed in accordance with the present invention. The welded metal structure 300 includes a first work piece 330 that is welded to a laminated metal structure 340 utilizing a fillet weld joint 354 that is formed in accordance with the present invention.

While the preferred embodiments and best modes for carrying out the present invention have been described in detail hereinabove, those familiar with the art to which this invention pertains will recognize various alternative designs and embodiments for practicing the invention within the scope of the appended claims.

The invention claimed is:

1. A method for welding a first work piece to a second work piece, the method comprising:
   placing the first work piece against the second work piece at a weld zone, said first work piece including a first metallic constraining layer, a second metallic constraining layer, and a polymeric layer disposed between and bonded to said first and second metallic constraining layers;
   feeding a consumable metal cored wire electrode to said weld zone through a welding gun;
   feeding a stream of shielding gas to said weld zone;
   forming at least one plug hole in one of the first and second work pieces at said weld zone;
   forming a weld joint at said weld zone including first melting said consumable metal cored wire electrode along a circumference of said at least one plug hole and thereafter progressively spiraling said welding gun inwards towards a center of said at least one plug hole substantially filling said at least one plug hole with said melted consumable metal cored wire electrode; and
   determining if said melting said consumable metal cored wire electrode is causing sputtering, and delaying said spiraling said welding gun inwards until said sputtering subsides while continuing to traverse the circumference of said at least one plug hole.

2. The method of claim 1, wherein said feeding said stream of shielding gas includes feeding a 0.5 second pre-flow and a 3 second post flow.

3. The method of claim 1, wherein said stream of shielding gas is approximately 90% argon and 10% carbon dioxide.

4. The method of claim 1, wherein said stream of shielding gas is fed at a flow rate of approximately 35 cubic feet per hour.

5. The method of claim 1, wherein said consumable metal cored wire electrode includes a metallic tubular body defining a hollow core at least partially filled with a welding powder.

6. The method of claim 1, wherein said consumable metal cored wire electrode is fed at a rate of approximately 135 inches per minute.

7. The welded metal structure formed by the method of claim 1.

8. A method of gas metal arc welding for welding a laminated steel structure to a second work piece, the laminated steel structure including first and second steel constraining layers bonded to a viscoelastic core disposed between and spanning substantially the entirety of the steel constraining layers, the method comprising:
   forming at least one plug hole through one of the laminated steel structure and the second work piece;
   overlapping the laminated steel structure and the second work piece at a predetermined weld zone;
   feeding a consumable metal cored wire electrode to the weld zone through a continuous-feeding type welding gun, said consumable metal cored wire electrode including a metallic tubular body defining a hollow core at least partially filled with a metallic powder;
   feeding a generally continuous stream of shielding gas to the weld zone generally contemporaneous with said feeding said consumable metal cored wire electrode;
   forming a weld joint at the weld zone including melting said consumable metal cored wire electrode into said at least one plug hole by forming an arc between said consumable metal cored wire electrode and at least one of the laminated steel structure and the second work piece including flowing through said consumable metal cored wire electrode an electrical current of sufficient amperage and voltage to melt said consumable metal cored wire electrode;
   wherein said forming said weld joint includes first melting said consumable metal cored wire electrode along a circumference of said at least one plug hole and thereafter progressively spiraling said welding gun inwards towards a center of said at least one plug hole and substantially filling said at least one plug hole with said melted consumable metal cored wire electrode; and
   wherein said forming said weld joint further includes determining if said melting said consumable metal cored wire electrode is causing sputtering, and delaying said spiraling said welding gun inwards until said sputtering subsides while continuing to traverse the circumference of said at least one plug hole.

9. The method of claim 1, wherein the second work piece includes another first metallic constraining layer, another second metallic constraining layer, and another polymeric layer disposed between and bonded to said another first and another second metallic constraining layers.

* * * * *